United States Patent
Oh et al.

(10) Patent No.: US 9,465,099 B2
(45) Date of Patent: Oct. 11, 2016

(54) METHOD FOR MEASURING POSITION OF VEHICLE USING CLOUD COMPUTING

(71) Applicant: Hyundai Motor Company, Seoul (KR)

(72) Inventors: Young Chul Oh, Seongnam-si (KR); Byung Yong You, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/486,640

(22) Filed: Sep. 15, 2014

(65) Prior Publication Data

US 2015/0185021 A1 Jul. 2, 2015

(30) Foreign Application Priority Data

Dec. 31, 2013 (KR) ........................ 10-2013-0168697

(51) Int. Cl.
| | |
|---|---|
| *G01C 21/28* | (2006.01) |
| *G01S 7/48* | (2006.01) |
| *G01S 17/06* | (2006.01) |
| *G01S 17/42* | (2006.01) |
| *G01S 7/00* | (2006.01) |
| *G08G 1/01* | (2006.01) |

(52) U.S. Cl.
CPC .............. *G01S 7/4808* (2013.01); *G01S 7/003* (2013.01); *G01S 17/06* (2013.01); *G01S 17/42* (2013.01); *G08G 1/0112* (2013.01)

(58) Field of Classification Search
CPC ...... G01C 21/20; G01C 21/26; G01C 21/30; G01C 21/34; G01C 21/3664; G01C 21/3679; G01C 21/005; G01C 21/28; G01S 17/06; G01S 17/003; G01S 17/42; G01S 17/46; G01S 17/88; G01S 17/89; G01S 7/003; G01S 7/4808; G01S 7/48; G01S 2205/001
USPC ....... 701/408, 409, 410, 420, 430, 514, 522, 701/532, 533, 537
See application file for complete search history.

(56) References Cited

U.S. PATENT DOCUMENTS

| | | | |
|---|---|---|---|
| 8,467,810 B2 | 6/2013 | Kaplan | |
| 8,467,928 B2 | 6/2013 | Anderson | |
| 8,473,144 B1 | 6/2013 | Dolgov et al. | |
| 9,014,903 B1* | 4/2015 | Zhu ................... | G01C 21/3446 382/103 |
| 2004/0158366 A1* | 8/2004 | Dieterle ............. | B60K 31/0008 701/23 |
| 2006/0061566 A1 | 3/2006 | Verma et al. | |
| 2008/0226130 A1* | 9/2008 | Kansal ................... | G01C 21/20 382/106 |
| 2010/0020169 A1* | 1/2010 | Jang ....................... | G01C 21/36 348/115 |
| 2010/0121577 A1* | 5/2010 | Zhang ................ | G06K 9/00805 701/301 |
| 2011/0216935 A1* | 9/2011 | Mays .................. | G01C 21/3446 382/100 |
| 2011/0282578 A1* | 11/2011 | Miksa ............... | G06F 17/30241 701/532 |
| 2011/0282581 A1* | 11/2011 | Zeng ..................... | G01S 17/936 701/301 |
| 2012/0281907 A1 | 11/2012 | Samples et al. | |
| 2013/0054050 A1* | 2/2013 | Filev ................. | B60W 50/0097 701/2 |

FOREIGN PATENT DOCUMENTS

| | | |
|---|---|---|
| JP | 2006-012176 A | 1/2006 |
| JP | 2009-250718 A | 10/2009 |
| JP | 2011-215052 A | 10/2011 |
| KR | 10-2012-0121696 A | 11/2012 |
| WO | 2013-045917 A1 | 4/2013 |

\* cited by examiner

*Primary Examiner* — Stephen Holwerda
(74) *Attorney, Agent, or Firm* — McDermott Will & Emery LLP

(57) ABSTRACT

A method of measuring a position of a vehicle using a cloud computing includes obtaining surrounding information according to a driving of the vehicle and driving information of the vehicle. The obtained surrounding information and the driving information of the vehicle are transmitted to a server which is remotely located from the vehicle and equipped with map data. A position of the vehicle is calculated through the surrounding information and the driving information of the vehicle by the server. The calculated position of the vehicle is transmitted to the vehicle. The calculated position of the vehicle is outputted.

10 Claims, 4 Drawing Sheets

METHOD FOR MEASURING POSITION OF VEHICLE USING CLOUD COMPUTING

CROSS-REFERENCE TO RELATED APPLICATION

This application claims the benefit of priority to Korean Patent Application No. 10-2013-0168697, filed on Dec. 31, 2013 in the Korean Intellectual Property Office, the entire content of which is incorporated herein by reference.

TECHNICAL FIELD

The present inventive concept relates to a method for measuring a position of a vehicle, and more particularly, to a method for measuring a position of a vehicle by extracting a feature point and by using a cloud computing.

BACKGROUND

A car navigation system is a navigation system designed for a use on a vehicle, and provides a function of guiding a current position based on a map, or searching and guiding a route from a starting point to a destination. Recently, the car navigation system provides a function of guiding an optimal route to a user by reflecting real-time traffic information due to recent development of communication technology.

In such a vehicle navigation system, a global positioning system (GPS) may be given as a typical method for identifying a position of the vehicle.

The GPS determines a position of a satellite and a receiver by receiving signals transmitted from three or more GPS satellites, and may obtain a distance between the satellite and the GPS receiver by measuring a time difference between a signal transmitted from the satellite and a signal received by the GPS receiver. In addition, since the transmitted signal may include information related to the position of the satellite, the position of the reception may be calculated by using a triangulation method when the distance to at least three satellites and the position of each satellite are known.

However, the position calculated based on the GPS signal may include many errors due to many environmental factors. In particular, in an area having high density of high-rise buildings, in which irregular reflection occurs or in a shadow area, the GPS reception signal may include errors, and accordingly, the position calculated from the GPS signal may be different from the actual position.

The vehicle navigation system may guide a path to a destination by matching a pre-set path to the location of the vehicle, and perform a re-search of the path, when the vehicle deviates the pre-set path. When an error occurs in the position value calculated based on the GPS signal, even if the actual vehicle is located on the pre-set path, the vehicle navigation system may determine a deviation of the path due to the error of position measurement. Thus, the vehicle navigation system may perform an unnecessary re-search, which causes inconvenience to the user.

SUMMARY

The present inventive concept has been made in view of the above problems, and provides a method for measuring a position of a vehicle using a cloud computing that precisely measuring a position of a vehicle even if the vehicle is not equipped with a large-capacity map, by extracting a feature point using Lidar and by using a map matching technique through the cloud computing.

One aspect of the present inventive concept relates to a method of measuring a position of a vehicle using a cloud computing, including obtaining surrounding information according to a driving of the vehicle and driving information of the vehicle. The obtained surrounding information and the driving information of the vehicle are transmitted to a server which is remotely located from the vehicle and equipped with map data. A position of the vehicle is calculated through the surrounding information and the driving information of the vehicle by the server. The calculated position of the vehicle is transmitted to the vehicle. The calculated position of the vehicle is outputted.

The surrounding information may relate to a feature point of a fixed object when only the fixed object that does not move exists around the vehicle.

The surrounding information may relate to the feature point of the fixed object, a feature point of a moving object, and moving information of the moving object, when the moving object together with the fixed object that does not move exist around the vehicle.

The driving information of the vehicle may include at least one of heading information related to a moving direction of the vehicle, time information related to times at which the feature points are detected, and speed information of the vehicle.

When only the fixed object that does not move exists around the vehicle, the calculating of the position of the vehicle may include determining a position in which the feature point of the fixed object is matched with the map data by the server, by using at least one of the transmitted heading information, the time information, and the speed information.

When both the moving object that moves and the fixed object that does not move exist around the vehicle, the moving information may include at least one of acceleration/deceleration information of the moving object and steering information related to the moving direction of the moving object, and the calculating of the position of the vehicle may include determining a position in which the feature point of fixed object and the feature point of the moving object are matched with the map data by the server, by using at least one of the transmitted heading information, the time information, the speed information, the feature point of the moving object, the acceleration/deceleration information, and the steering information of the moving object.

The determining of the position in which the feature point of fixed object and the feature point of the moving object are matched with the map data may include synchronizing the driving information and the moving information. Before outputting the calculated position of the vehicle, the method may further include correcting the calculated position of the vehicle by the vehicle. The feature points may be extracted by using Lidar.

In the calculating of the position of the vehicle, a time of transmitting surrounding information and driving information of a first vehicle to the server may be synchronized with a time of transmitting surrounding information and driving information of a second vehicle to the server, based on a particular time, and a corrected vehicle position may be obtained by synchronizing based on the particular time.

BRIEF DESCRIPTION OF THE DRAWINGS

The objects, features and advantages of the present inventive concept will be more apparent from the following detailed description in conjunction with the accompanying drawings, in which like reference characters may refer to the same or similar parts throughout the different views. The drawings are not necessarily to scale, emphasis instead being placed upon illustrating the principles of the embodiments of the inventive concept.

DETAILED DESCRIPTION

Exemplary embodiments of the present inventive concept are described with reference to the accompanying drawings in detail. The same reference numbers are used throughout the drawings to refer to the same or like parts. Detailed descriptions of well-known functions and structures incorporated herein may be omitted to avoid obscuring the subject matter of the present inventive concept.

A GPS technology is widely used to measure a current position of a vehicle, and may include an error ranging from 5 to 15 m on average. Thus, it lacks sufficient precision to determine the position of the vehicle. To solve such a problem, a method of precisely determining the position of the vehicle using a map matching may be provided, but this method requires a large-capacity map data installed in the vehicle. In addition, the map matching method does not have information related to a neighboring vehicle such as a moving object except for the map data, that is, does not have surrounding information except the map data. Therefore, a feature point for a fixed object which is not movable is essentially required to determine the position of the vehicle. Eventually, the position of the vehicle can be measured only in a limited space such as a crossroad.

However, in a vehicle position measuring method using a cloud computing according to an exemplary embodiment of the present inventive concept, since the vehicle extracts only a feature point of a fixed object or a moving object, and the large-capacity map data is processed through a cloud computer, it is possible to solve the above problem and to measure an exact position of the vehicle in real-time.

Figure 1:
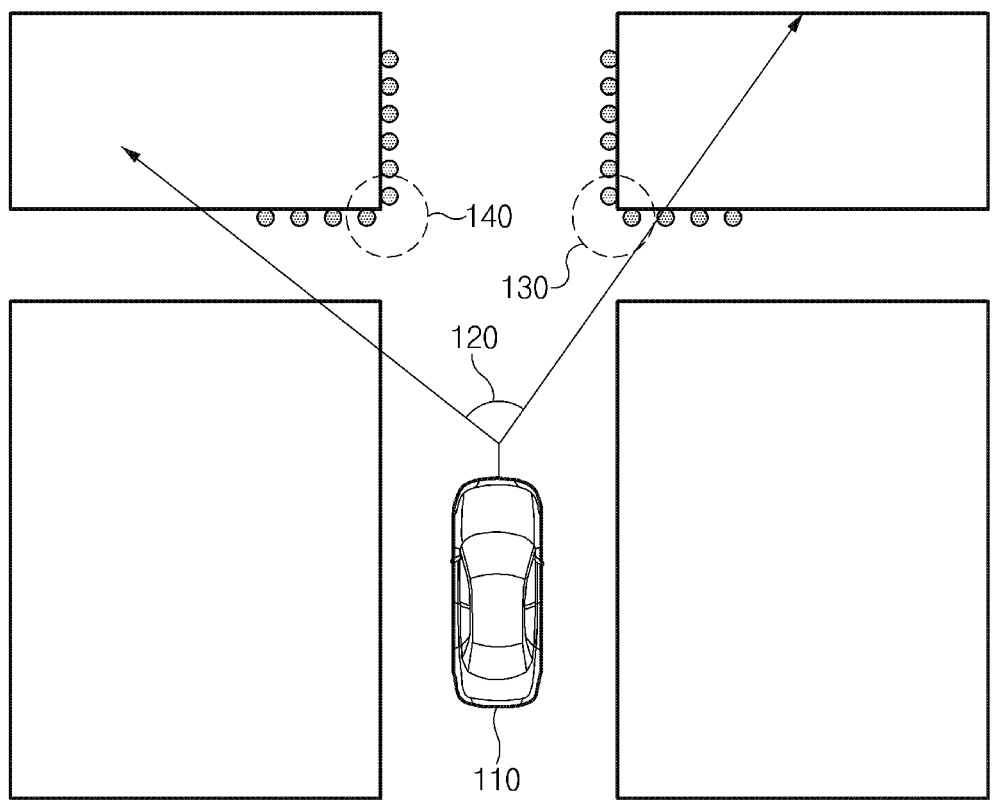
FIG. 1 is a diagram illustrating a vehicle position measuring method using a cloud computing when using only a feature point of a fixed object according to an exemplary embodiment of the present inventive concept.

FIG. 1 is a diagram illustrating a vehicle position measuring method using a cloud computing when using only a feature point of a fixed object according to an exemplary embodiment of the present inventive concept.

Referring to FIG. 1, there is no moving object except for a vehicle 110 for measuring a position. That is, FIG. 1 illustrates a method of accurately measuring the position of the vehicle when only the fixed object exists around. Here, the feature point may be extracted by using Lidar.

Figure 4:
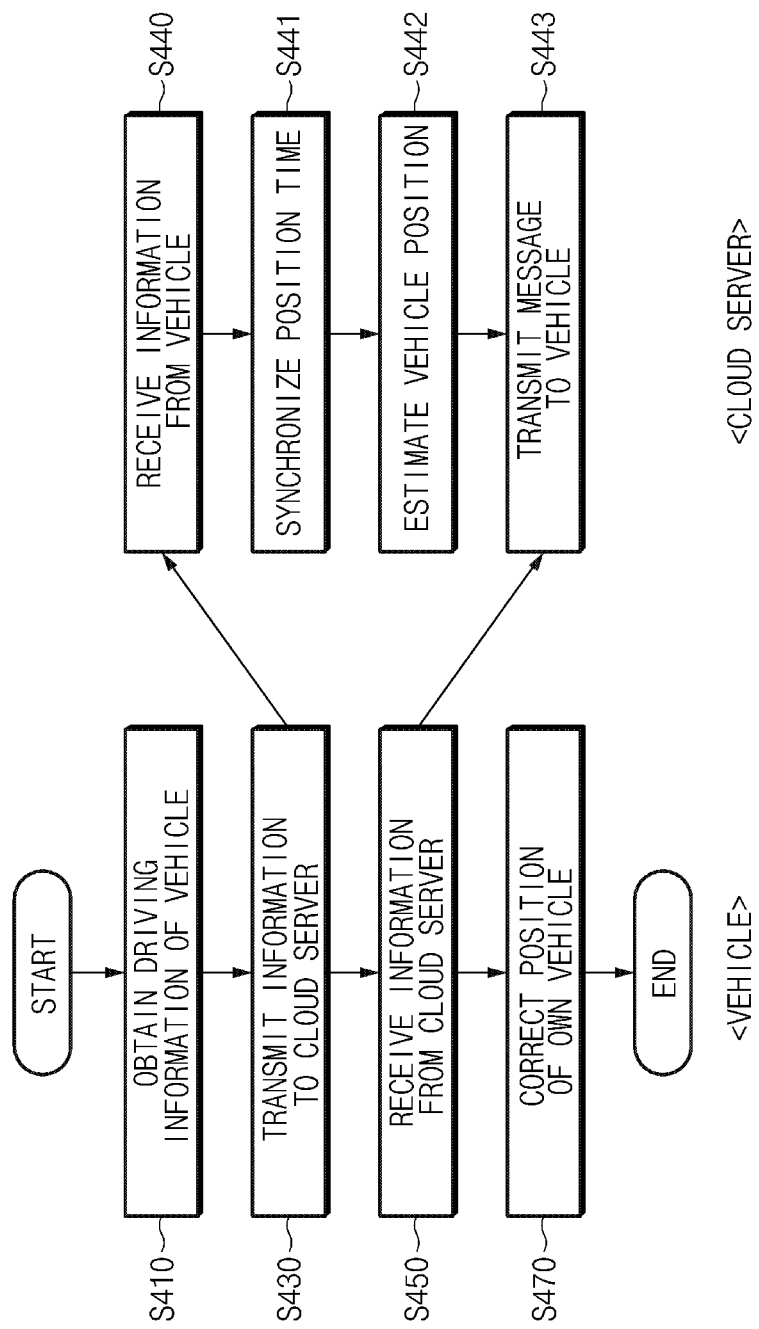
FIG. 4 is a flowchart illustrating a vehicle position measuring method using a cloud computing according to an exemplary embodiment of the present inventive concept.

FIG. 4 is a flowchart illustrating a vehicle position measuring method using a cloud computing according to an exemplary embodiment of the present inventive concept.

Referring to FIG. 1 and FIG. 4, first, the vehicle 110 may obtain surrounding information according to a driving of the vehicle 110 and the vehicle's own driving information (S410).

Here, the surrounding information according to a driving of the vehicle may be information related to the feature points 130 and 140 of the fixed object. Further, the driving information may include at least one of heading information related to the moving direction of the vehicle 110, time information 120 related to times at which feature points 130 and 140 of the fixed object are detected, and speed information of the vehicle 110.

Thereafter, the vehicle 110 may transmit the obtained surrounding information and driving information to a server, e.g., cloud server, remotely located from the vehicle 110 (S430). Here, the server may be provided with map data, and the vehicle 110 may be able to perform data communication in order to transmit the above information. For example, corresponding information can be transmitted to the server through a vehicle's own telematics service, and if the telematics service is not available, corresponding information can be transmitted to the server through a wireless terminal (using application) possessed by a driver of the vehicle.

Then, the server may calculate the position of the vehicle 110 through the surrounding information and the driving information transmitted from the vehicle 110 (S440, S442). Here, the server may determine the position in which the feature points 130 and 140 of fixed object is matched with the provided map data, by using at least one of the heading information, the time information, and the speed information transmitted from the vehicle 110.

Then, the server may transmit the calculated position of the vehicle 110 to the vehicle 110 (S443). After receiving information from the server (S450), the vehicle 110 may output the transmitted position of the vehicle 110 to visually provide the position of the vehicle 110 to a passenger of the vehicle 110. Further, the vehicle 110 may automatically correct the calculated position of the vehicle (S470) before outputting the calculated position of the vehicle 110 to the driver of the vehicle 110.

Figure 2:
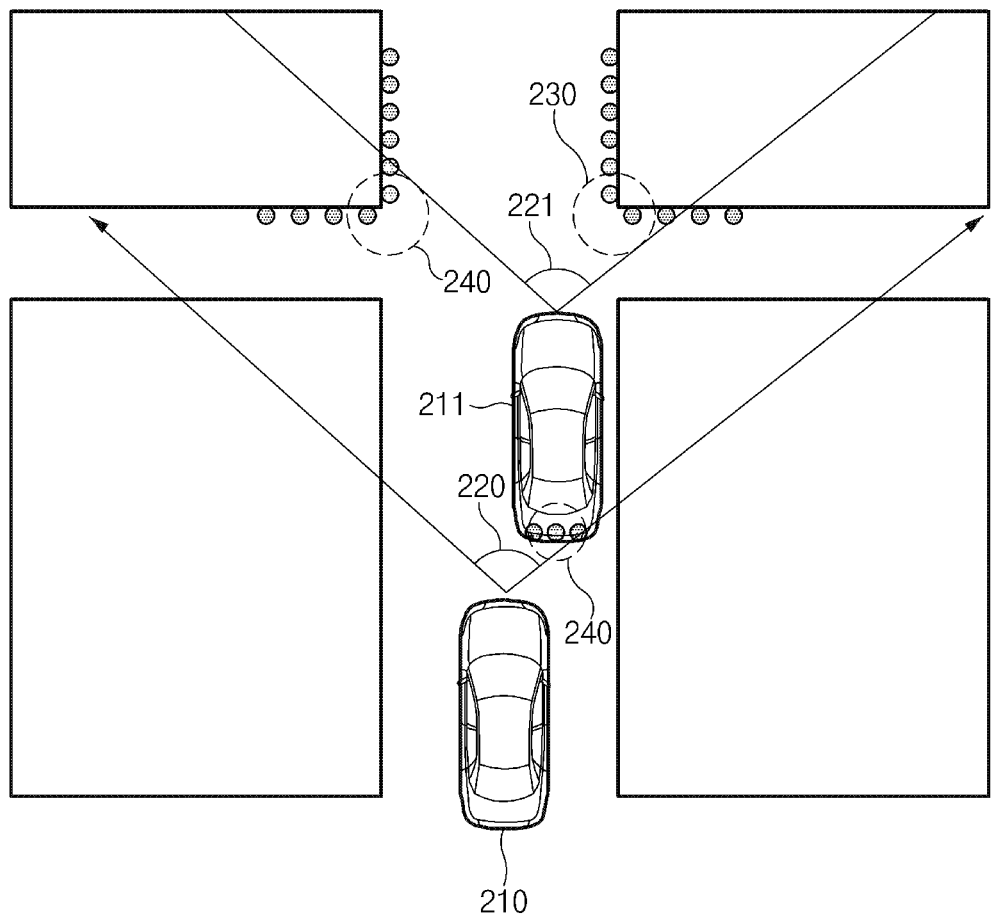
FIG. 2 is a diagram illustrating a vehicle position measuring method using a cloud computing when using a feature point of a fixed object and information of a moving object according to an exemplary embodiment of the present inventive concept.

FIG. 2 is a diagram illustrating a vehicle position measuring method using a cloud computing when using a feature point of a fixed object and information of a moving object according to an exemplary embodiment of the present inventive concept.

Referring to FIG. 2, there exists another vehicle 211 together with a vehicle 110 for measuring a position. Further, there exists a moving object as well as a fixed object. That is, FIG. 2 illustrates a method of accurately measuring the position of driver's own vehicle when both the fixed object and the moving object exist around. Here, the feature point may be extracted by using Lidar.

FIG. 4 is a flowchart illustrating a vehicle position measuring method using a cloud computing according to an exemplary embodiment of the present inventive concept.

Referring to FIG. 2 and FIG. 4, first, a vehicle 210 may obtain surrounding information according to a driving of the vehicle 210 and the vehicle's own driving information (S410).

Here, the surrounding information according to a driving of the vehicle may be information related to feature points 230 and 240 of the fixed object, a feature point 250 of a moving object 211, and moving information of the moving object 211. The moving information of the moving object 211 may be at least one of acceleration/deceleration information of the moving object 211 and steering information 221 related to the moving direction of the moving object 211. Further, the driving information (of the vehicle 210) may be at least one of heading information related to the moving direction of the vehicle 210, time information 220 related to times at which feature points 230 and 240 of the fixed object are detected, and speed information of the vehicle 210.

Thereafter, the vehicle 210 may transmit the obtained surrounding information and driving information to a server, e.g., a cloud server, remotely located from the vehicle 210 (S430). Here, the server may be provided with map data, and the vehicle 210 may be able to perform data communication in order to transmit the above information. A detailed description is identical with a case of the above mentioned vehicle 110.

Then, the server may calculate the position of the vehicle 210 through the surrounding information and the driving information transmitted from the vehicle 210 (S440, S441, S442). Here, the server may determine the position in which the feature points 230 and 240 of fixed object and the feature point 250 of the moving object 211 are matched with the provided map data, by using at least one of the heading information, the time information, and the speed information transmitted from the vehicle 210, the feature point 250, acceleration/deceleration information, and steering information 221 of the moving object 211. Further, the server may synchronize the driving information (of the vehicle 210) and the moving information (of the moving object 211) transmitted from the vehicle in order to determine the position in which the feature points 230 and 240 of fixed object and the feature point 250 of the moving object 211 are matched with the map data. The synchronization will be described later in detail with reference to FIG. 3.

The server may transmit the calculated position of the vehicle 210 to the vehicle 210 (S443). After receiving information from the server (S450), the vehicle 210 may output the transmitted position of the vehicle 210 to visually provide the position of the vehicle 210 to a passenger of the vehicle 210. Further, the vehicle 210 may automatically correct the calculated position of the vehicle (S470) before outputting the calculated position of the vehicle 210 to the driver of the vehicle 210.

Figure 3:
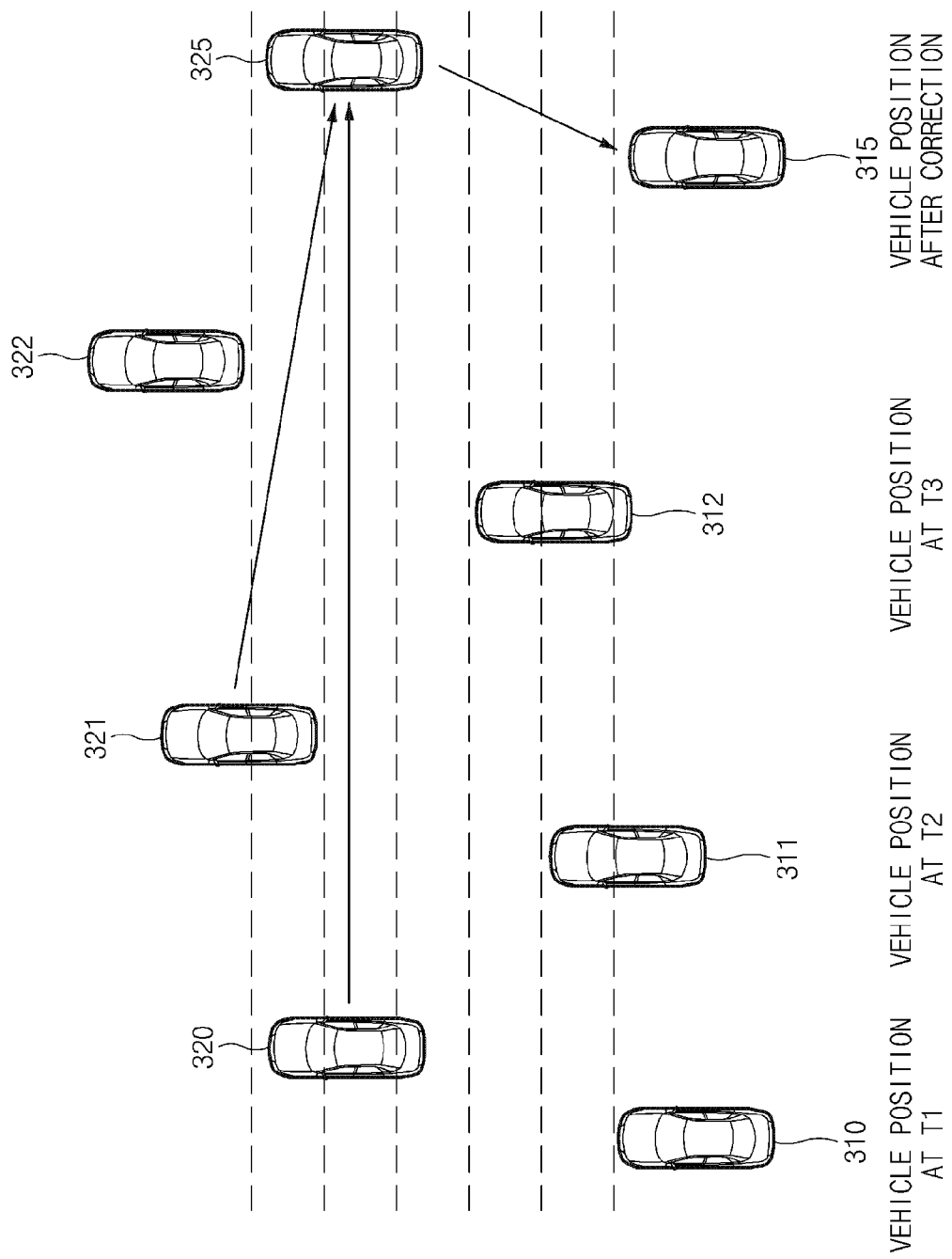
FIG. 3 is a diagram illustrating a vehicle position measuring method using a cloud computing while displaying synchronization of time information of a cloud computer according to an exemplary embodiment of the present inventive concept.

FIG. 3 is a diagram illustrating a vehicle position measuring method using a cloud computing while displaying synchronization of time information of a cloud computer according to an exemplary embodiment of the present inventive concept.

Referring to FIG. 3, both the actual position of the vehicle and the corrected position of the vehicle are shown according to time T1, T2, T3.

The time of transmitting own surrounding information and the driving information to the server by a target vehicle 310, 311, 312, 315 for detecting the position may be different from the time of transmitting own surrounding information and driving information to the server by other vehicle 320, 321, 322, 325. For example, when the target vehicle 310 transmits its own surrounding information and driving information to the server at time T1 and then another vehicle 312 transmits its own surrounding information and driving information to the server at time T2, the server may synchronize corresponding transmission times based on a same time (e.g., T1). The rightmost diagram of FIG. 3 shows the result. The corrected vehicle position may be obtained by modifying and synchronizing based on a time T1 of receiving information related to the target vehicle 310, 311, 312, 315 for detecting the position although the server actually received information related to other vehicle 320, 321, 322, 325 at a time T2.

Thus, in the vehicle position measuring method using a cloud computing according to an exemplary embodiment of the present inventive concept, the map data may not be provided to the vehicle itself, but provided to the remotely located server. The vehicle may obtain various types of information for measuring the position of the vehicle. However, since all of the procedure for processing a high-capacity data such as the feature point matching is performed in the server, and the performed result is transmitted to the vehicle, the continuous real time position measurement may be possible in the vehicle without maintenance of high-capacity map.

A method for measuring a position of a vehicle using a cloud computing according to the present inventive concept may precisely measure a position of a vehicle even if the vehicle is not equipped with a large-capacity map, by extracting a feature point using Lidar and by using a map matching technique through the cloud computing.

Although exemplary embodiments of the present inventive concept have been described in detail hereinabove, it should be clearly understood that many variations and modifications of the basic inventive concepts herein taught which may appear to those skilled in the present art will still fall within the spirit and scope of the present inventive concept, as defined in the appended claims.

What is claimed is:

1. A method of measuring a position of a vehicle using a cloud computing, the method comprising:
   obtaining surrounding information according to a driving of the vehicle and driving information of the vehicle;
   transmitting the obtained surrounding information and the driving information of the vehicle to a server which is remotely located from the vehicle and equipped with map data;
   calculating, by the server, a position of the vehicle through the surrounding information and the driving information of the vehicle;
   transmitting the calculated position of the vehicle to the vehicle; and
   outputting the calculated position of the vehicle,
   wherein the driving information of the vehicle comprises at least one of heading information related to a moving direction of the vehicle, time information related to times at which feature points of fixed objects are detected, and speed information of the vehicle, and
   wherein when only a fixed object that does not move exists around the vehicle, the calculating of the position of the vehicle comprises determining a position in which a feature point of the fixed object is matched with the map data by the server, by using at least one of the transmitted heading information, the time information, and the speed information.

2. The method of claim 1, wherein the surrounding information relates to a feature point of a fixed object when only the fixed object that does not move exists around the vehicle.

3. The method of claim 1, wherein the surrounding information relates to a feature point of a fixed object, a feature point of a moving object, and moving information of the moving object, when the moving object together with the fixed object that does not move exist around the vehicle.

4. The method of claim 3, wherein the driving information of the vehicle comprises at least one of heading information related to a moving direction of the vehicle, time information related to times at which the feature points are detected, and speed information of the vehicle.

5. The method of claim 4, wherein
when both the moving object that moves and the fixed object that does not move exist around the vehicle,
the moving information comprises at least one of acceleration/deceleration information of the moving object and steering information related to a moving direction of the moving object, and
the calculating of the position of the vehicle comprises determining a position in which the feature point of fixed object and the feature point of the moving object are matched with the map data by the server, by using at least one of the transmitted heading information, the time information, the speed information, the feature point of the moving object, the acceleration/deceleration information, and the steering information of the moving object.

6. The method of claim 5, wherein the determining of the position in which the feature point of fixed object and the feature point of the moving object are matched with the map data comprises synchronizing the driving information and the moving information.

7. The method of claim 1, further comprising correcting, before outputting the calculated position of the vehicle, the calculated position of the vehicle by the vehicle.

8. The method of claim 2, wherein the feature points are extracted by using Lidar.

9. The method of claim 3, wherein the feature points are extracted by using Lidar.

10. The method of claim 1, wherein the calculating of the position of the vehicle includes:
synchronizing a time of transmitting surrounding information and driving information of a first vehicle to the server, with a time of transmitting surrounding information and driving information of a second vehicle to the server, based on a particular time; and
obtaining a corrected vehicle position by synchronizing based on the particular time.

* * * * *